United States Patent [19]

Sheehan et al.

[11] 4,249,285
[45] Feb. 10, 1981

[54] POULTRY KILLING METHOD AND MACHINE

[75] Inventors: Jerry D. Sheehan, Lee's Summit; Donald J. Scheier, Kansas City, both of Mo.

[73] Assignee: Simon-Johnson, Inc., Kansas City, Mo.

[21] Appl. No.: 44,319

[22] Filed: May 31, 1979

[51] Int. Cl.³ .............................................. A22C 21/00
[52] U.S. Cl. ............................................ 17/52; 17/12
[58] Field of Search ................................ 17/12, 45, 52

[56] References Cited

U.S. PATENT DOCUMENTS

| 1,389,784 | 9/1921 | Rece et al. | 17/12 |
|---|---|---|---|
| 2,793,393 | 5/1957 | Fosdick | 17/12 |
| 2,854,690 | 10/1958 | O'Donnell | 17/12 |
| 2,874,402 | 2/1959 | Boykin | 17/12 |
| 2,924,846 | 2/1960 | Zebarth | 17/12 |
| 3,271,815 | 9/1966 | Hooley | 17/12 |
| 3,477,092 | 11/1969 | Simmons | 17/45 X |
| 3,490,092 | 1/1970 | Harrison | 17/12 X |
| 3,514,809 | 6/1970 | Barbour et al. | 17/12 |
| 3,737,948 | 6/1973 | Van Mil | 17/12 X |
| 3,765,055 | 10/1973 | Lewis | 17/12 X |
| 3,805,328 | 4/1974 | Strandine et al. | 17/11 |
| 3,956,794 | 5/1976 | Verbakel | 17/12 |
| 4,184,230 | 1/1980 | Fox et al. | 17/12 X |

*Primary Examiner*—Willie G. Abercrombie
*Attorney, Agent, or Firm*—Schmidt, Johnson, Hovey & Williams

[57] ABSTRACT

In a machine for use in poultry processing plants, a succession of birds, suspended by their legs from an overhead conveyor, are advanced through a zone of arcuate movement in conjunction with a horizontal rotor so constructed that each bird is separately handled and individually controlled until a cut is effected into its neck sufficient to sever at least one blood vessel, causing the bird to bleed to death, all without decapitation. In the killing method, as the necks are guided horizontally along the arcuate path, the head and the neck are simultaneously captured adjacent and below the precise area where cutting is to take place at the skull. At the same time, the neck is captured near the bird's body and is stretched during rotation with the rotor while the head is held against ascent such that little, if any, neck skin remains attached to the skull along the slice that is produced by the cutter.

22 Claims, 12 Drawing Figures

POULTRY KILLING METHOD AND MACHINE

The present invention relates to the field of processing poultry for commercial distribution, the machine and method being limited to that area of initial kill effected by blood vessel severance at the neck of the fowl, resulting in death by bleeding. The overhead conveyor for the birds, universally used in processing plants, is modified to direct the horizontally moving birds through an essentially semi-circular path along the outer periphery of a rotor which turns about a vertical axis in timed relation to the speed of the conveyor. An arcuate guide channel receives the necks and similarly shaped guides are engaged by the shackles and by the bodies of the birds for restricting the movement such as to conform to the path of the conveyor trolleys.

Cooperating with the guides to place each bird individually under the complete control of the machine is a series of capturing elements spaced evenly throughout the circumference of the rotor for rotation therewith and extending radially outwardly across the guide channel, with each element receiving a portion of the bird. Two of the elements receive the neck, one just above and the other below but adjacent the guide channel. A third element beneath the guide channel receives the head.

Through use of a stationary cam arrangement within the rotor, the upper, spring-loaded neck-capturing element rises along the neck until it engages the bird's body such as to stretch the vertical necks longitudinally as the heads are held against ascent by the guide channel. A tilter engages the back of the neck within the notch between the skull and the first vertebra to tip the head upwardly until the beaks point inwardly toward the vertical axis of rotation of the rotor. At the same time, a rotating cutter slices the stretched neck within the notch to sever one or more arteries.

For the most part, commercial procedures which result in birds bleeding to death in absence of decapitation have been hand operations wherein, through use of a knife, an operator simply cuts into the neck or alongside the head in order to sever one or more blood vessels. On the other hand, machines have, in recent years, appeared on the market operating on the principle of severing across the back of the neck adjacent the skull. In those instances, however, the birds are not separately controlled. Instead, they are advanced through the machine in a manner similar, for example, to the illustration of U.S. Pat. No. 3,271,815 relating to a "Poultry Head Remover"; to the showing of U.S. Pat. No. 2,924,846, also having to do with removal of the head; and to the operation depicted in U.S. Pat. No. 3,956,794 of a machine to sever the head from the neck. The lack of individual capture and proper control of the bird, particularly of the neck and head, produces less than satisfactory results when all that is desired is to effect sufficient cutting to cause death by bleeding while leaving the head attached.

Individual capture in a deheading machine, but in a manner quite different from the instant invention, is suggested in U.S. Pat. No. 2,874,402. Successive capture of decapitated necks is contemplated by U.S. Pat. No. 3,737,948. Severance of the head at the base of the skull while the head slides beneath spaced guide bars is disclosed in U.S. Pat. No. 3,514,809.

In a deheading machine, U.S. Pat. No. 2,793,393, shows an endless sprocket chain with spaced head-receiving fingers. Neck stretching is included in the head removing machine of U.S. Pat. No. 2,854,690. Killing by puncturing to cause bleeding without removal of the head is referred to in relation to a hand device in U.S. Pat. No. 1,389,784.

In the drawings:

FIG. 8 is a view showing the back of the bird with all parts positioned as in FIG. 9;

Figure 1:
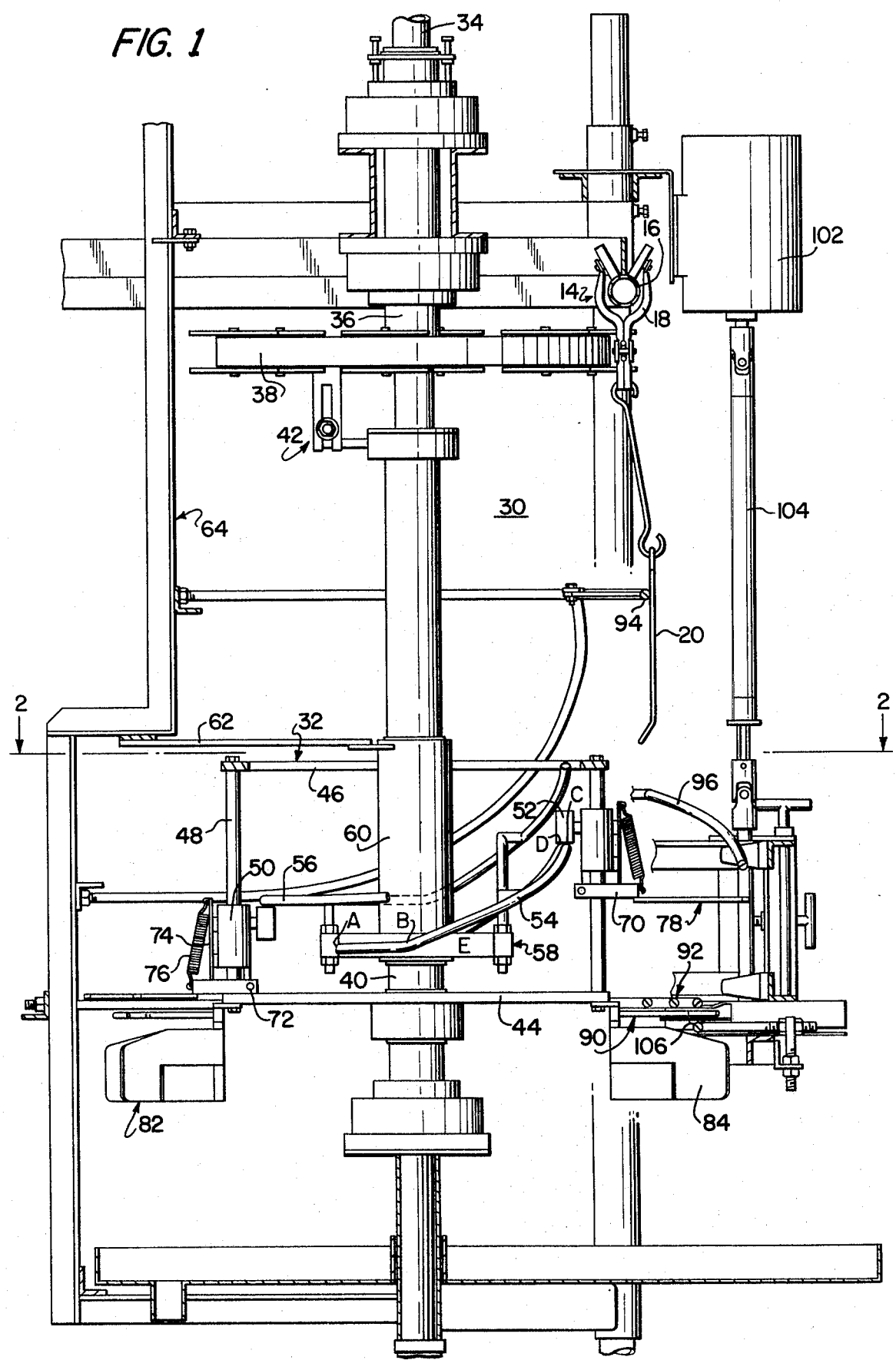
FIG. 1 is a fragmentary, elevational view, parts being broken away and in section, of a poultry killing machine involving our present invention and adaptable for use in carrying out our novel method.

Overhead conveyors, such as illustrated in part by FIG. 1, and broadly designated 14, normally include a horizontal track 16 supporting a series of trolleys 18 provided with shackles 20, each of which pendulously suspends a bird 22 (FIGS. 6-10) by its legs 24 in a position with its neck 26 and head 28 down. Manifestly, as the interconnected trolleys 18 are pulled along the track 16, the birds 22 are advanced in a continuous train, it being understood that in FIG. 1 there is partially shown only a small arcuate section of the conveyor 14 so shaped as to accommodate the conveyor 14 for use in connection with a bird-killing machine 30 forming the subject matter of the instant invention.

The machine 30 has a rotor 32 (FIGS. 1 and 2) rotatable about the vertical axis of the arcuate section of the conveyor 14, there being an upright support 34 carrying an upper, hollow shaft 36 to which is secured a sprocket-like wheel 38 that is turned by the trolleys 18. A lower, tubular shaft 40 on the support 34 is driven by a connection 42 with the wheel 38, and the rotor 32 has a lower circular plate 44 (FIGS. 1-10) attached to the shaft 40. The rotor 32 also includes an upper annular ring 46 joined with the plate 44 by a number of pairs of upright rods 48.

Each pair of rods 48 carries a pair of vertically reciprocable, interconnected sleeves 50 and on the inner face of each sleeve 50, there is provided a roller 52 operable between a pair of stationary, arcuate cams 54 and 56 within the rotor 32, common to the rollers 52 and carried by a spoke arrangement 58 secured to a sleeve 60 on the shaft 40 held against rotation by a bar 62 connected with frame 64 of the machine 30.

A T-shaped bracket 66 on the inner face of each double sleeve 50 below the roller 52 has a tube 68 embraced by the legs of a U-shaped member 70 that is swingable up and down by virtue of a hinge pin 72 through the tube 68. A plate 74 on the outer face of each double sleeve 50 carries a spring 76 that is connected to the bite of the member 70 to hold the latter abutted against the lower edge of the plate 74. Each member 70 has an outwardly extending furcation 78 consisting of two forks of differing lengths for capturing the necks 26 at the body 80 of the bird 22 to raise the body 80 and stretch the neck 26, as will hereinafter be further explained.

Beneath each furcation 78, there is provided an embrasure 82 attached to the plate 44 for individual capturing of the heads 28 simultaneously with the individual capture of each body 80 by the furcation 78. Each embrasure 82 has a pair of spaced, plate-like cheeks 84, an inner neck 86 and a head-receiving mouth 88 that is wider than the neck 86.

The plate 44 also carries a pair of fingers 90 for holding the heads against ascent, there being a pair of such fingers 90 disposed between each furcation 78 and the associated embrasure 82.

A pair of spaced, stationary guide elements 92 slidably received the necks 26 therebetween adjacent the heads 28. The elements 92, carried by the frames 64, are disposed between the furcations 78 and the fingers 90. The frame 64 also carries a guide 94 for the shackles 20 and a guide 96 for the bodies 22. The outer element 92 has a stripper 98 for removing the necks 26 from the furcations 78 and the fingers 90 and for removing the heads 28 from the embrasures 82.

Supported on the frame 64 is a cutter disc 100 and a prime mover 102 for rotating the disc 100 through an upright shaft 104. The disc 100 is located beneath and across the outer guide element 92 and between the fingers 90 and the embrasures 82 as they traverse the disc 100. A short head-tilting plate 106 carried by the frame 64 beneath the disc 100 and above the upper level of the cheeks 84 extends inwardly across the outer guide 92.

Operation

The overhead conveyor 14 advances the previously stunned live birds 22 one at a time to the mouth (FIG. 2) between the guides 92—92 for continued movement along the essentially semicircular guides 92—92 by virtue of the similarly-shaped track sections 16. All the while the rotor 32 of the machine 30 is rotating anticlockwise (viewing FIG. 2) in timed relation to the conveyor 14, successively bringing the sets of furcations 78, embrasures 82 and fingers 90 simultaneously to the widened entrance shown in FIG. 2 between the guides 92—92, such that each set receives and individually controls a corresponding bird 22.

Figure 2:
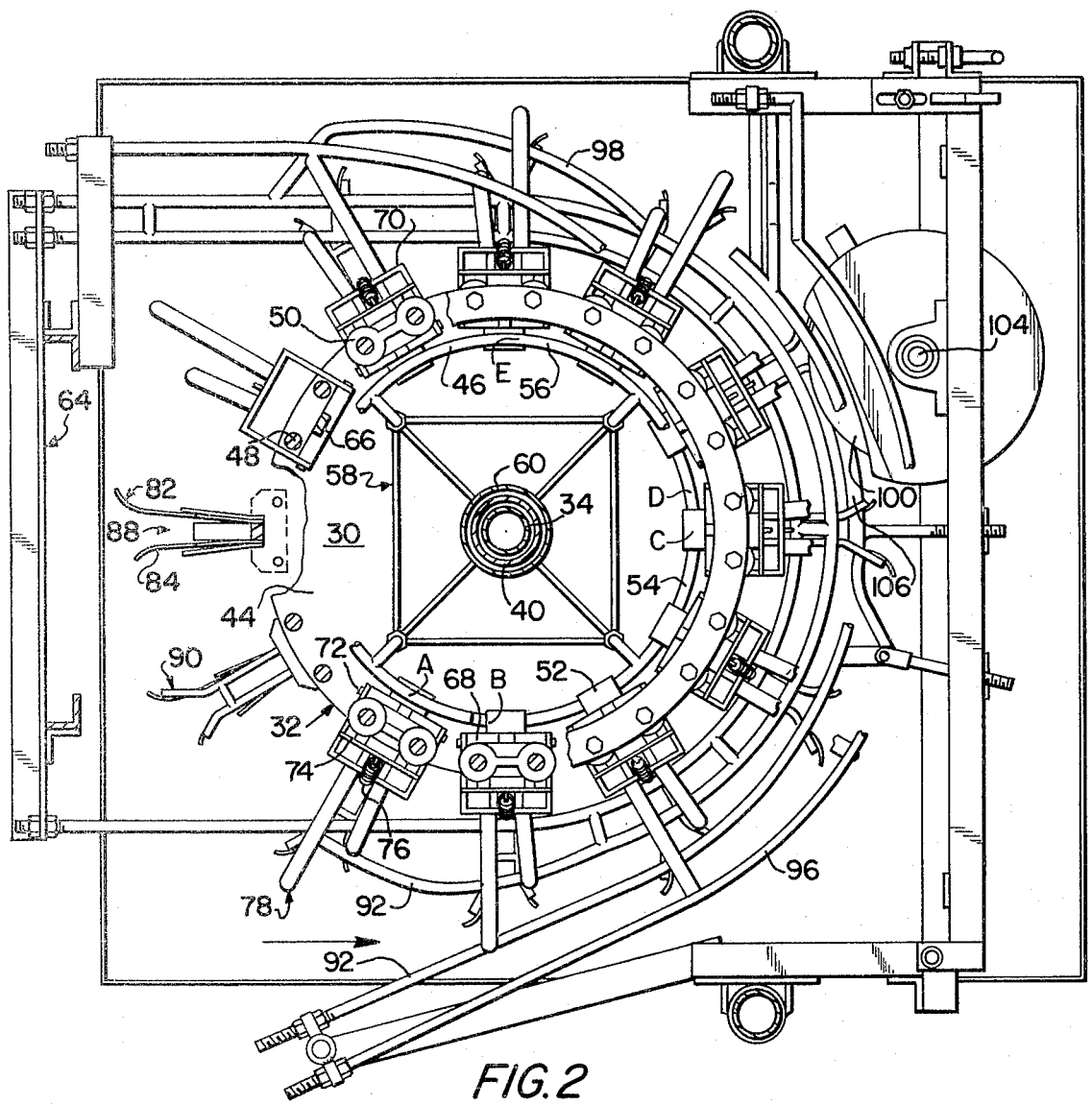
FIG. 2 is an essentially top plan view, partially in section, of the machine illustrated in FIG. 1, taken on line 2—2 of FIG. 1, illustrating by arrow the path of movement of the birds at the entrance throat.
Figure 3:
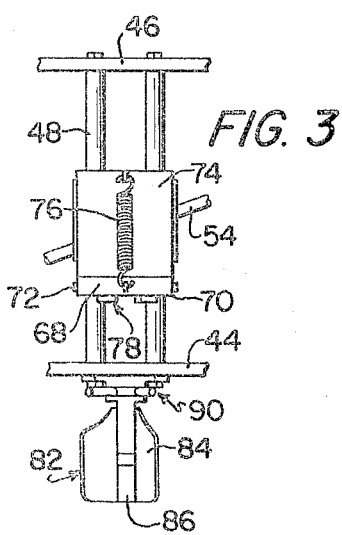
FIG. 3 is a fragmentary, outer, elevational view of the rotor, certain of the guides and one of the head-neck capturing units.
Figure 4:
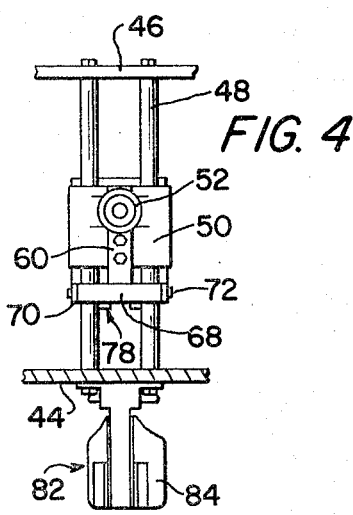
FIG. 4 is a view similar to FIG. 3 looking in the opposite direction.
Figure 5:
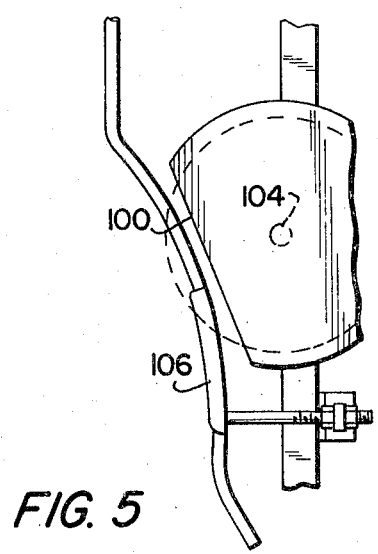
FIG. 5 is a fragmentary plan view of the cutter and the head tilter.
Figure 6:
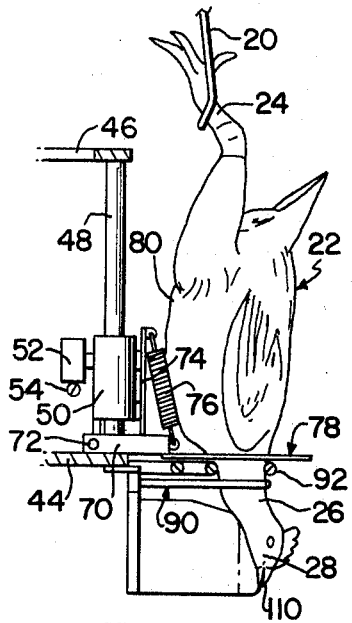
FIGS. 6-9 are views showing the trailing side of the bird in association with the rotor, illustrating successive position of parts and of the bird as it advances toward the cutter.

At that time, the upper cam 56, acting on the rollers 52 from above will have lowered the double sleeves 50 on their rods 48 to the lower ends of their vertically reciprocable paths of travel against or adjacent the plate 44 such that the furcations 78 directly overlie the inner guide 92 and the fingers 90 directly underlie the inner guide 92 as seen in FIGS. 1, 2 and 6.

The longer, trailing fork of the furcation 78 pushes the neck 26 along the inner guide 92 until the neck 26 is captured between both forks as seen in FIG. 6. Such action is augmented by the pushing action of the longer, trailing finger 90 as the neck 26 is similarly captured by the fingers 90 below the guides 92, also shown clearly in FIG. 6.

Figure 7:
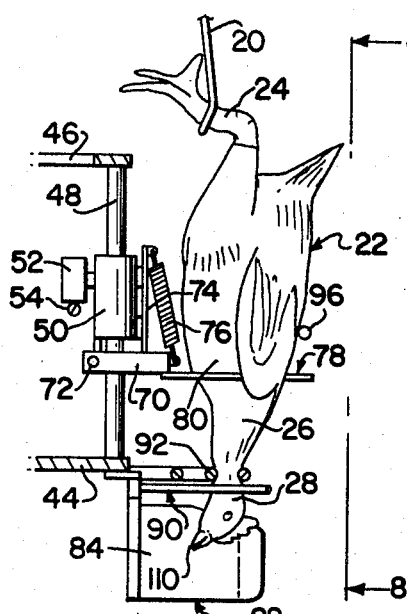

Thus, the bird 22 comes into the complete control of the machine, first by virtue of a somewhat tic-tac-toe arrangement wherein the neck 26 is received by two parts 78 across and above two parts 92 and between two parts 90 across and below the parts 92. The individual control of each bird is then furthered by the way in which the head 28 is wedged between the cheeks 84 and the body 80 is retrained by the guide 96, as seen in FIG. 7, as progress is made toward the cutter discs 100.

The first short section of the cam control 54, 56 is horizontal at the entrance mouth and continues upwardly in a gradual slope as seen in FIG. 1 toward the cutter 100. This raises the rollers 52, the sleeves 50, the furcations 78, and therefore, the bodies 80 to progressively stretch the vertical necks 26 longitudinally because of the way the neck-receiving furcations 79 engage the bodies as seen in FIG. 7 and because of the fact that the guide elements 92, engaging the heads 28, hold the latter against ascent.

Figure 9:
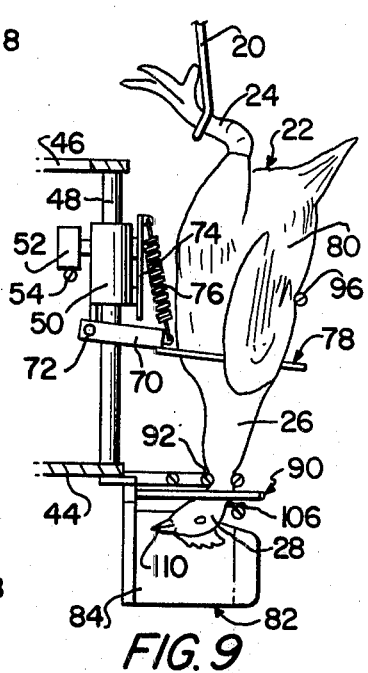
Figure 8:
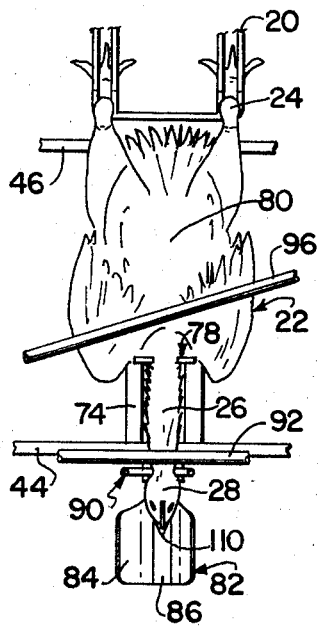

The members 70 and their furcations 78 can, however, yield about the pins 72 as permitted by the springs 76, and as shown in FIG. 9, to accommodate for necks 26 of differing lengths; thus, there exists a yieldable tension on the necks 26 during the stretching operation.

At about the moment the necks 26 and heads 28 reach the cutter 100, the upward slope of the cams 54, 56 ceases so as to discontinue further stretching. In fact, the cams 54 and 56 have a short horizontal stretch at their upper ends traversed by the rollers 52 while the birds 22 are being subjected to the action of the cutter 100.

Figure 10:
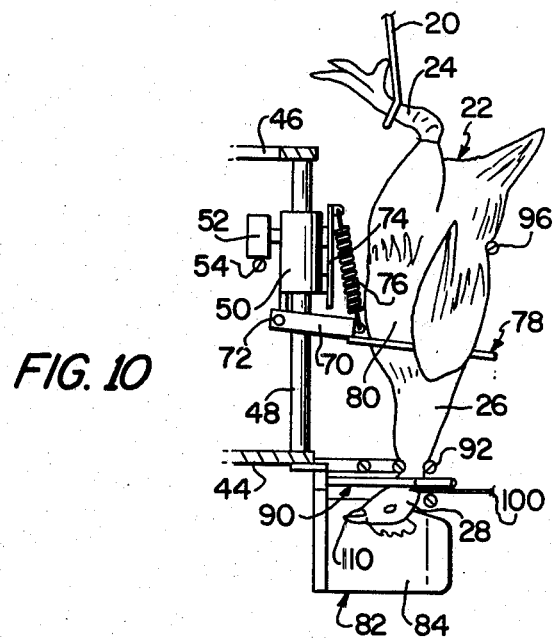
FIG. 10 is a view similar to FIGS. 6-9 illustrating the cutting step.
Figure 11:
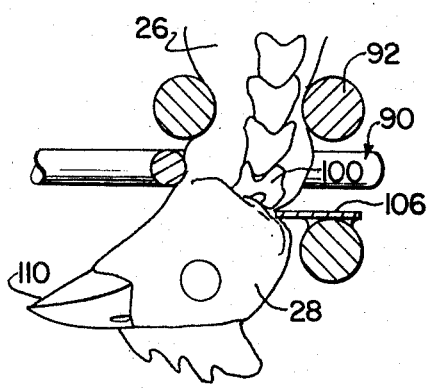
FIG. 11 is an enlarged view somewhat similar to FIG. 9 showing the head-tilting operation.
Figure 12:
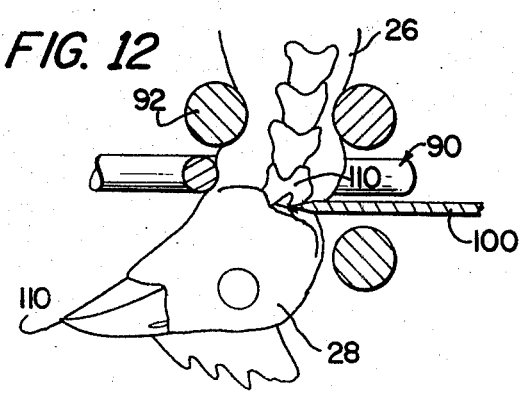
FIG. 12 is an enlarged view similar to FIG. 10 showing the cutting operation.

Also, as the necks 26 and heads 28 closely approach the cutter 100, the plate 106 functions to tilt the heads 28 upwardly with their beaks 108 pointed toward the axis of rotation of the rotor 32 as depicted in FIGS. 9-11. The bowl-shaped occipital bone at the base of the skull, being attached to the first vertebra or "atlas" 110 by membranes and by a fibrous capsule, there is presented a notch into which the plate 106 enters to cause the tilting of the heads 28, thereby precisely exposing and orienting such notch to the cutter 100 just prior to entry of the cutter 100 into the notch above the plate 106, all as is clear in FIGS. 9-12. This, therefore, assures a slicing action within the membranous tissues to sever at least one blood vessel, and oftentimes to cut into the spinal cord.

The cams 54 and 56 drop off immediately after the slicing action to lower the furcations 78. Then, as the birds 22 reach the stripper 98, they are fully released for continuation beyond the machine 30 to the next area within the processing plant wherein the kill is completed by bleeding from the severed vessel or vessels.

We claim:

1. In a method of initial killing of birds without decapitation prior to further processing for use as they are advanced horizontally in a continuous train tendulously suspended by their legs in a neck down position, said method including the steps of:

separately capturing the head of each suspended bird as the birds are advanced;

guiding the necks and bodies of the birds in a continuity of sequential progression along a curvilinear path of travel;

holding the captured heads against ascent as they are advanced horizontally along said path;

progressively and separately raising said bodies as they are advanced along said path to vertically stretch said necks longitudinally thereof between the captured heads and the bodies until the necks successively reach a condition of preselected tension; and effecting a horizontal slit transversely of each neck during uninterrupted advancement of the captured heads and as the necks successively reach said condition of preselected tension.

2. The invention of claim 1 wherein prior to effecting the slit the captured heads are oriented during advancement along said path to point the beaks inwardly toward the axis of said path, and wherein each neck is slit within that notched, membranous area opposite the beak between the base of the skull and the first vertebra.

3. The invention of claim 2 wherein said bodies are advanced horizontally when the necks reach said condition to preclude further stretching of the necks during the slitting step.

4. The invention of claim 2 wherein the slit enters to a depth for severing at least one blood vessel.

5. The invention of claim 4 wherein the slit enters to a depth for cutting into the spinal cord.

6. The invention of claim 2 wherein the head of each bird is tilted relative to the neck upwardly and inwardly toward said axis during advancement along said path as the necks reach said condition, and the head is held in the tilted position at least during commencement of the slitting step.

7. The invention of claim 2 wherein an upward yieldable bias on the bodies is maintained as they are advanced along said path and until the slitting has been effected.

8. The invention of claim 2 wherein the neck of each bird adjacent its body is separately captured simultaneously with the capture of its head and held captured until the slitting step has been effected.

9. The invention of claim 2 wherein the necks are guided adjacent said area.

10. For use with an arcuate section of an overhead conveyor having means for uninterrupted horizontal advancement of a continuous train of birds pendulously suspended by their legs in a neck down position, a machine for successive initial killing of the birds without decapitation prior to further processing for use, said machine including:

a rotor beneath the conveyor at said section mounted for rotation about an upright axis in timed relationship to said conveyor;

means attached to said rotor and rotatable therewith for separately capturing the head of each bird as it approaches the path of arcuate advancement;

stationary guide means for maintaining the necks of the birds confined to said arcuate path;

means attached to said rotor and rotatable therewith for separately holding each captured head against ascent as it advances along the arcuate path;

means attached to said rotor and rotatable therewith for progressively and separately raising the bodies of the birds as they advance along the arcuate path to vertically stretch said necks longitudinally thereof between the captured heads and the bodies until the necks reach a condition of preselected tension; and cutter means separate from the rotor, spaced radially outwardly therefrom within said path and disposed to transversely slice each neck as the necks successively reach said condition of preselected tension.

11. The invention of claim 10 wherein said capturing means has parts for orienting the captured heads during advancement along the arcuate path to point the beaks inwardly toward the axis of said path, and wherein the cutter means is disposed to slice each neck within the notched, membranous area between the base of the skull and the first vertebra.

12. The invention of claim 11; and stationary means adjacent said path and disposed for engaging the necks within said notched area to tilt the heads upwardly relative to the necks and point the beaks of the birds inwardly toward said axis during commencement of the slicing of the necks.

13. The invention of claim 11 wherein said body raising means includes a series of furcations spaced around the rotor above the guide means for separately capturing the neck of each bird adjacent its body simultaneously with the capture of each head.

14. The invention of claim 13 wherein each furcation is independently shiftable vertically on the rotor, and wherein is provided stationary cam means for raising the furcations as the birds advance along said path.

15. The invention of claim 14 wherein each furcation has a vertically shiftable support, wherein each furcation is swingable up and down on its support and wherein each furcation is yieldably biased upwardly relative to its support.

16. The invention of claim 11 wherein said head capturing means include a series of embrasures spaced around the rotor below the guide means, each provided with a pair of spaced cheeks, an inner neck and an outer, head-receiving mouth wider than the neck.

17. The invention of claim 16 wherein said holding means include a number of pairs of spaced, neck-receiving fingers spaced around the rotor between the guide means and the embrasures.

18. The invention of claim 17 wherein said guide means includes a pair of spaced arcuate elements disposed to slidably receive the necks therebetween adjacent the heads.

19. The invention of claim 18; and stationary means adjacent said path and disposed for engaging the necks within said notched area to tilt the heads upwardly relative to the necks and point the beaks of the birds inwardly toward said axis during commencement of the slicing of the necks.

20. The invention of claim 19 wherein said body raising means includes a series of furcations spaced around the rotor above the guide means for separately capturing the neck of each bird adjacent its body simultaneously with the capture of each head.

21. The invention of claim 20 wherein each furcation is independently shiftable vertically on the rotor, and wherein is provided stationary cam means for raising the furcations as the birds advance along said path.

22. The invention of claim 21 wherein each furcation has a vertically shiftable support, wherein each furcation is swingable up and down on its support and wherein each furcation is yieldably biased upwardly relative to its support.

* * * * *